United States Patent
Ericson et al.

(10) Patent No.: US 7,167,164 B2
(45) Date of Patent: Jan. 23, 2007

(54) RECORDING AND COMMUNICATION OF HANDWRITTEN INFORMATION

(75) Inventors: Petter Ericson, Malmö (SE); Örjan Johansson, Veberöd (SE)

(73) Assignee: Anoto AB, Lund (SE)

( * ) Notice: Subject to any disclaimer, the term of this patent is extended or adjusted under 35 U.S.C. 154(b) by 794 days.

(21) Appl. No.: 09/986,762

(22) Filed: Nov. 9, 2001

(65) Prior Publication Data

US 2002/0090149 A1 Jul. 11, 2002

Related U.S. Application Data

(60) Provisional application No. 60/257,835, filed on Dec. 21, 2000, provisional application No. 60/261,122, filed on Jan. 12, 2001, and provisional application No. 60/316,025, filed on Aug. 31, 2001.

(30) Foreign Application Priority Data

| Nov. 10, 2000 | (SE) | ................................................ | 0004105 |
| Nov. 13, 2000 | (SE) | ................................................ | 0004156 |
| Aug. 27, 2001 | (SE) | ................................................ | 0102828 |

(51) Int. Cl.
G09G 5/00 (2006.01)

(52) U.S. Cl. ........................ 345/179; 345/162; 345/175; 715/748; 178/18.01

(58) Field of Classification Search ................. 345/156, 345/162, 173, 175, 179, 532, 537, 543, 564; 178/18.5–18.1, 19.1–19.5; 250/206.1, 370.1, 250/363.02, 363.06, 550, 566, 568
See application file for complete search history.

(56) References Cited

U.S. PATENT DOCUMENTS

| 5,294,792 | A | * | 3/1994 | Lewis et al. ................. | 250/221 |
| 5,652,412 | A | | 7/1997 | Lazzouni et al. | |
| 5,661,506 | A | | 8/1997 | Lazzouni et al. | |
| 5,729,251 | A | * | 3/1998 | Nakashima ................. | 709/250 |
| 5,852,434 | A | | 12/1998 | Sekendur | |
| 6,002,387 | A | * | 12/1999 | Ronkka et al. ............. | 345/157 |
| 6,003,047 | A | | 12/1999 | Osmond et al. | |
| 6,188,392 | B1 | * | 2/2001 | O'Connor et al. .......... | 345/179 |
| 6,192,165 | B1 | | 2/2001 | Irons | |
| 6,292,181 | B1 | * | 9/2001 | Banerjee et al. ............. | 345/179 |
| 6,486,875 | B1 | * | 11/2002 | O'Donnell, Jr. ............. | 345/179 |
| 6,563,494 | B1 | * | 5/2003 | Eichstaedt et al. .......... | 345/179 |
| 6,592,039 | B1 | * | 7/2003 | Smith et al. ........... | 235/462.49 |

FOREIGN PATENT DOCUMENTS

| EP | 0171284 A2 | 2/1986 |
| EP | 0206246 A2 | 12/1986 |
| GB | 2306669 | 5/1997 |
| WO | 97/15896 | 5/1997 |
| WO | 99/50787 | 10/1999 |
| WO | 00/72110 A2 | 11/2000 |
| WO | 00/72110 A2 | 11/2000 |
| WO | 00/72133 A1 | 11/2000 |
| WO | 00/72244 A1 | 11/2000 |
| WO | 00/73983 A1 | 12/2000 |
| WO | 01/26032 A1 | 4/2001 |
| WO | 01/26033 A1 | 4/2001 |
| WO | 01/48591 A1 | 7/2001 |
| WO | 01/48678 A1 | 7/2001 |
| WO | 01/48685 A1 | 7/2001 |
| WO | 01/61636 A2 | 8/2001 |
| WO | 01/86405 A1 | 11/2001 |

* cited by examiner

*Primary Examiner*—Henry N. Tran
(74) *Attorney, Agent, or Firm*—Birch, Stewart, Kolasch & Birch, LLP

(57) ABSTRACT

A hand-held user unit (1), which can be part of a network-based information management system, allows for the writing down and recording of handwritten information. The user unit (1) has a memory for storing the recorded information. The memory comprises a first memory part (M1) located in the user unit and a second memory part (M2) located in an external data storage device, which memory parts are connected in such a way that, from the point of view of a user, they form a coherent memory unit.

Methods for memory management in such a user unit are also described.

28 Claims, 4 Drawing Sheets

RECORDING AND COMMUNICATION OF HANDWRITTEN INFORMATION

This application claims benefit of Ser. No. 60/257,835 filed Dec. 21, 2000, and claims benefit of Ser. No. 60/261,122 filed Jan. 12, 2001, and claims benefit of Ser. No. 60/316,025 filed Aug. 31, 2001.

TECHNICAL FIELD

The present invention relates to hand-held units for recording handwritten information.

TECHNICAL BACKGROUND

There are a number of ways to communicate handwritten information electronically. One alternative is to write the information on a sheet of paper and thereafter to send the information via a fax machine. An alternative way of sending handwritten information electronically is to scan it in and to send it electronically via, for example, electronic mail or using the mobile telephone network. A disadvantage of both methods is that two steps are required to enter the handwritten text electronically. In a first step the user writes the text on a base and in a second step the handwritten text is converted into electronic format via optical reading in the scanner or the fax machine.

International Patent Applications WO 01/48591, WO 01/48678 and WO 01/48685 describe user units and methods for recording and communicating handwritten information electronically. A user unit of the type described in said WO documents has a memory in which the information that has been recorded by the user unit is stored. The user unit can be arranged to send information by wireless means to, for example, a mobile telephone or a personal computer, from which the information is forwarded to the correct recipient, typically via an information management unit in the form of a network server or the like. An example of information that can be recorded by the user unit is a handwritten message, a signature or a handwritten address on a form.

In several cases, it can be advantageous to save the information recorded by the user unit for use at a later occasion. This is the case, for example, if the user has recorded his personal details and selections on an order form and wants to add to the order at a later time. It is then advantageous to be able to add to the previously entered information. Similarly, the user can choose to delay sending a handwritten message to a recipient, in order to be able to add to and/or dispatch the message at a later time.

A user unit for recording handwritten information is advantageously hand-held and is a typical home electronics product. In order to keep the price of the product down, this is therefore provided with a relatively small internal memory unit.

This means that the amount of information that can be stored in the user unit is relatively limited and that information that has been recorded by the user unit must be deleted after a while. It is, however, difficult to know what information can be deleted and what should be saved. If we choose to make the memory unit large in order to reduce the need to delete so often, there is the risk that the user unit will be undesirably expensive.

Within the technical field of hand-held user units for recording information, the provision of replaceable memory cards for a hand-held user unit is described in WO 97/15896. The storage capacity of the user unit can thereby be increased as required, however at the expense of a reduction in user-friendliness, increased cost to the user, a reduction in the freedom of design of the user unit, increased risk of operational disturbances caused by the ingress of dust, moisture, etc.

Within the technical field of personal computers, the provision of external storage memory via a network connection is already known, for example for security back-ups of files on the personal computer's hard disk or for file sharing, such as, for example, described in U.S. Pat. No. 6,192,165 and U.S. Pat. No. 6,003,047.

SUMMARY OF THE INVENTION

An object of the present invention is to overcome the above problem at least partially.

More specifically, the present invention aims to provide a hand-held user unit for writing down and recording handwritten information, which allows the user to send the recorded information to a recipient at any time after it was written down.

Another object of the invention is to describe a technology that makes it possible to keep down the production cost for such a hand-held user unit.

Another object is to overcome the above problem without the need to make changes to the user's behavior or to the equipment communicating with the user unit.

An additional object is also to describe a technology that enables the user to reduce the cost of sending the handwritten information to a recipient.

These and other objects that will be apparent from the following description have now been achieved, completely or partially, by means of hand-held user units according to claims 1 and 14, a system for information management according to claim 17, and methods according to claims 24 and 28. Preferred embodiments are defined in the subsequent dependent claims.

According to the invention, the memory of the user unit is divided between a first internal memory unit and a second external memory unit, which are connected in such a way that, from the point of view of the user, they form a coherent or unified memory unit. By means of the invention, the user unit can still be produced at a low cost, while at the same time its actual memory can, in principle, be made any size at all. Thus, a subset of information can be deleted from the internal memory unit in order to free locally available memory, without this subset of information being lost to the user unit as a whole, by the subset of information being moved to the external memory unit.

The external memory unit can, for example, be realized in the form of one or more hard disks, which permit the storage of large amounts of data at a low cost. The internal memory unit consists suitably of some form of compact non-volatile memory unit, such as a flash memory, a miniaturized hard disk or a RAM with uninterruptable power supply.

The invention thus makes it possible to design the user unit in such a way that, from the point of view of the user, it has an unlimited memory capacity. The user can thereby send the recorded information at any time after it has been written down. The user unit is able to operate with any size of memory capacity and without the user being forced to change his handling of the user unit in relation to prior-art technique.

The user unit also contains a means that records electronically the information that is written down by means of the user unit. This recording preferably takes place at the same time as the information is written down. This can be carried out in a plurality of different ways within the scope of prior art, such as via accelerometers and/or gyroscopes, via triangulation equipment, via mechanical movement detection (trackball or the like), via interference analysis on the basis of laser light emitted and reflected from a base, etc. It is, however, preferable for the recording means to comprise an image sensor for recording, preferably optically, an absolute position code on a base. As a result, it is possible to connect the functionality to the absolute positions that are coded on the base, as described in Applicant's Applications WO 01/48591, WO 01/48678 and WO 01/48685, which are incorporated herein by reference.

According to an embodiment of the user unit, this comprises a means for the transmission of information between the first and second memory units, the first memory unit being arranged to receive and store the recorded information from the recording means and the information transmission means being arranged to transfer according to predetermined rules at least a subset of the recorded information from the first to the second memory unit for storage therein.

The information can thus be transferred automatically, without additional input from the user, according to the predetermined rules. The application of predetermined rules has advantages for both the user and the user unit. The user can in fact optimize the user unit to his own requirements. For example, the user can configure the user unit to transfer the information at a time when the cost for this is minimal, for example during the night. This configuration is, for example, relevant in a mobile embodiment, where the information is transferred from the internal memory to the external memory at least partially via a mobile telephone network. In an embodiment where the user unit is able to communicate via both a mobile telephone network and a computer network, the user unit can be configured to transfer the information only when it is in contact with the computer network, so that the information is transferred at minimal cost. Alternatively, the user unit can be configured to transfer information when the information transmission means has access to a given bandwidth. The user can also prioritize between different types of information, so that certain information is transferred as soon as possible, while other information is transferred at minimal cost. For example, the user can indicate such prioritization at the time of writing, for example by marking a selection box on the base or by activating a switch on the user unit. In an advantageous embodiment, the transmission is configured for minimal user disturbance, for example by the transmission being carried out latently when the user unit is being switched off, when the user unit is being placed in a given position, or when a switched-on user unit has not recorded any new information for a given period of time. Of course, the above examples of rules can also be combined.

From the point of view of the user unit, it can be advantageous to have a rule that information is transferred from the internal memory unit when this has attained a given level of fullness. This rule is simple to implement and secures the efficaciousness of the user unit. The information can be transferred in accordance with a FIFO principle (First In, First Out), or in accordance with some other suitable algorithm. The level of fullness can in this connection correspond to an amount of memory occupied in the internal memory unit. When dynamic compression is used, that is when the internal memory unit is permitted to become completely full and the information stored therein is thereafter further compressed as more information is added, the level of fullness can correspond to a degree of compression.

Alternatively, or in addition, the rules can comprise the information being transferred from the internal memory unit when it has been stored therein for a certain period of time.

The above-mentioned information transmission means can be realized in the form of a combination of software, which is executed in a processor in the user unit, and a communication unit, for example for direct connection to a computer network or mobile telephone network, or for wireless short-range communication with an external network connection unit such as a mobile telephone, a PDA or a personal computer. The communication unit can alternatively be designed for wired communication.

According to a preferred embodiment, the information transmission means is arranged to carry out exclusively one-way transmission of information from the first to the second memory unit. This embodiment minimizes the flow of information between the memory units, which is particularly advantageous when the communication link between the memory units is expensive and/or has low bandwidth, for example in the above-mentioned mobile embodiment where the transmission between the memory units takes place at least partially via a mobile telephone network. The user unit can in fact be a part of an information management system, in which the recorded information is communicated and processed in different ways. As mentioned above, the user can choose to write down interrelated information at different times, and initiate transmission of this information to a recipient at an even later time. Before the information can be forwarded, it must be collated, which according to this embodiment is thus carried out from the external memory unit.

This embodiment also means that the collated information is forwarded from the external data storage device that contains the external memory unit. User units can thus be connected to external memory units without the need to modify existing information management units. In an information management system as mentioned above, the users can in fact be offered access to external memory units as an optional service for the user units. The above embodiment allows for a uniform interface between the user units and the information management units, irrespective of whether the user units are connected to any external memory unit or not.

A further advantage of the invention is that the external data storage device that contains the external memory unit can have a considerably larger data processing capacity than can be achieved in small, compact, hand-held user units. Thus, the stored information can thereby be processed according to considerably more complicated rules than what would be possible in a hand-held user unit.

According to a further embodiment, the information transmission means is arranged to transfer all the recorded information to the second memory unit. This means that the user has access to all the recorded information via the external memory unit, irrespective of whether the information has been forwarded in the information management system or not. The information can, for example, be time-stamped at the time of recording, in order to facilitate searching in the external memory unit.

It is preferable for the transmission of information to be initiated via a "send" command from the user unit. The "send" command initiates the transmission of associated information from the internal memory unit to the external memory unit, and collation of associated information in connection to the external memory unit.

According to a preferred embodiment, the recorded information comprises a plurality of absolute positions that form an electronic version of the handwritten information. The information can, in this case, be recorded from a base with an absolute position code, as mentioned above.

After recording the "send" command, the hand-held user unit is preferably arranged to obtain an address for the information management unit by a request to an external look-up unit and on the basis of the position content in the recorded information. Thus the position content in the recorded information controls where the information is to be sent for further processing, which increases the possibilities for, and simplifies, communication and management of handwritten information.

According to one embodiment, the user unit is arranged to obtain said address via a communication unit in the external data storage device. Thus, both the load on the processor in the user unit and the data traffic to and from the user unit are reduced. In a mobile embodiment, where the user unit communicates at least partially via a mobile telephone network, it can also be important to minimize this data traffic for reasons associated with bandwidth and/or cost.

According to a possible alternative, the address is obtained via a communication unit in the user unit and is transferred to the external data storage device, together with any associated information in the internal memory unit.

According to an additional alternative, the information management of the recorded information is carried out directly in the external data storage device, or else this contains all the addresses of the information management units in the system, for which reason an address query does not need to be made.

According to another aspect of the present invention, this relates to a system for information management. The system comprises an information management unit and a hand-held user unit which is designed for writing down and recording handwritten information, the user unit being arranged to store the recorded information in a memory and to communicate a required part of this to the information management unit via a communication network. The user unit's memory comprises a first memory unit located in the user unit and a second memory unit located in an external data storage device, which memory units are connected in such a way that, from the point of view of the user, they form a coherent memory unit.

Advantages and additional possible features of the system are apparent from the above discussion of the user unit.

According to an additional aspect of the invention, this relates to a method for providing memory capacity for a user of a hand-held user unit which is designed for recording handwritten information. The method comprises the steps of reserving memory capacity for the user unit in an external data storage device, receiving recorded information from the user unit and storing the same in the external data storage device, and sending the recorded information to an information management unit in response to a "send" command.

Advantages and additional possible features of the method are apparent from the above discussion of the user unit.

According to a preferred embodiment, the received information is stored for a predetermined period of time from the time it is recorded, the user being charged on the basis of the length of the period of time. This embodiment is easy to understand and intuitive for the user, who can then easily determine when recorded information will be deleted from the memory.

According to an alternative embodiment, the user is charged on the basis of the memory capacity reserved for the user in the external data storage device.

According to an additional aspect of the invention, this relates to a method for memory management in a user unit which is arranged to record handwritten information. The method comprises the steps of storing the recorded information in a first memory unit in the user unit, and transferring at least a subset of the recorded information from the first memory unit to a second memory unit in an external data storage device in accordance with predetermined rules in such a way that, from the point of view of the user, the first and the second memory units form a coherent memory unit.

Advantages and additional possible features of the method are apparent from the above discussion of the user unit.

BRIEF DESCRIPTION OF THE DRAWINGS

In the following, preferred embodiments of the invention will be described with reference to the following schematic drawings, in which.

DESCRIPTION OF PREFERRED EMBODIMENTS

Figure 1:
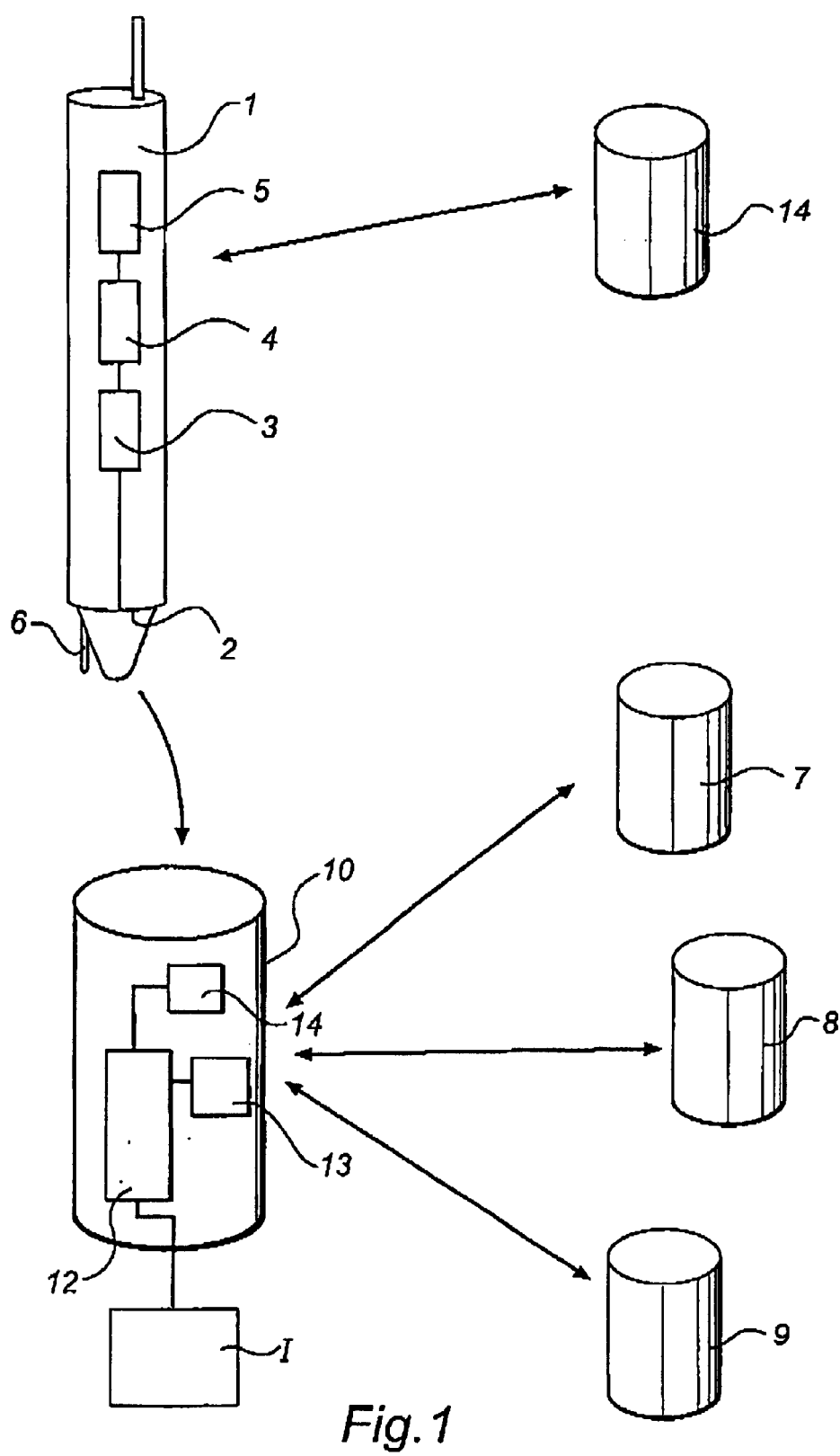
FIG. 1 shows a system according to an embodiment.

FIG. 1 shows a system for information management according to an embodiment of the invention. A hand-held user unit in the form of a digital pen 1 is designed for electronic recording of handwritten information. In the preferred embodiment, the pen 1 has a two-dimensional sensor 2 for recording images, a main processor unit 3 for processing the images recorded by means of the sensor 2 and for converting these into a sequence of positions that describes the movement of the pen 1 while the information was being written down, an internal memory unit 4 for storing the information recorded by means of the main processor unit 3, a transceiver 5 for communication of the recorded information and an ordinary writing implement 6 for showing, by emission of a pigment, the information written down.

In the currently preferred embodiment, the sensor 2 is a two-dimensional CMOS sensor that can be caused to record up to 100 images per second, where each image comprises 100×128 pixels with a spatial resolution of 30 μm and a grayscale resolution of 8 bits. The main processor unit 3 is a specially designed hardware circuit (ASIC), which is based on a 72 MHz ARM7TDM circuit and which, among other things, handles image processing, position storage, application protocol, databases and character interpretation (ICR) in the pen 1. The memory unit 4 is a combination of a 16 Mbit flash memory circuit and a 2 Mbit SRAM circuit, of which the whole SRAM circuit and 25% of the flash memory circuit are allocated to the main processor unit 3, while the remainder of the flash memory circuit is used for storage of the recorded information.

The system in FIG. 1 also comprises a number of service providing units 7–9, typically server units, which receive the recorded information from the pen 1 and process this for the execution of various services, for example the sending of electronic messages such as SMS, fax or e-mail, or the recording of orders for goods or services.

The pen's 1 transceiver 5 can, for example, be a modem for connection to a mobile telephone network, which allows for direct communication with the service providing units 7–9. Alternatively, the pen's transceiver 5 can be designed to communicate with a network connection unit (not shown), for example a mobile telephone, a PDA or a PC, which allows for connection to a mobile telephone network or computer network for communication with the service providing units 7–9. In the latter case, the transceiver 5 can be designed for wireless short-range communication via radio, for example in accordance with the Bluetooth® standard, or via an infrared link, for example in accordance with the IrDA standard.

The system also comprises a data storage device 10, typically a network server or a personal computer, which comprises a transceiver 11 for communication with the transceiver 5, a memory unit 12 and a communication unit 13 for communication with the service providing units 7–9, suitably via a computer network, for example the Internet. The operation of the data storage device 10 will be described in greater detail below with reference to FIG. 3.

The system also comprises a look-up unit 14, typically a network server, which directs the pen to the correct service providing unit 7–9 on the basis of the recorded information, as will be described in greater detail with reference to FIG. 2.

Figure 2:
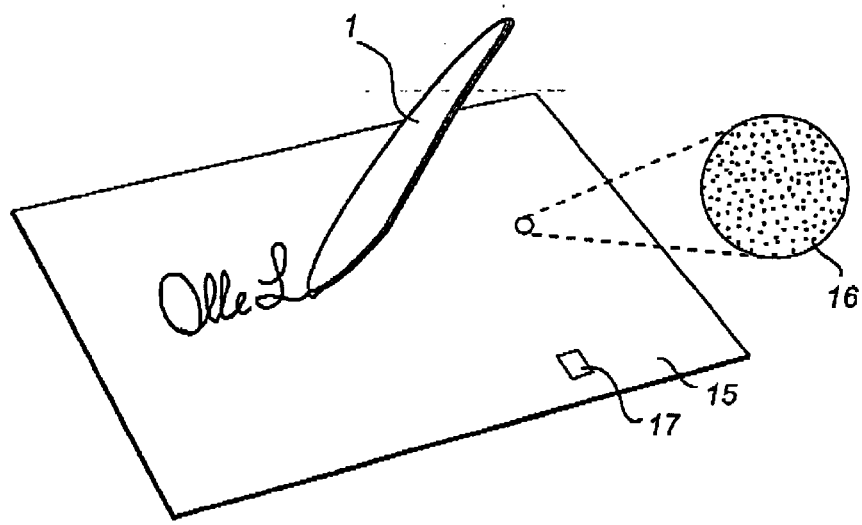
FIG. 2 illustrates the use of a user unit in a system according to the invention.

FIG. 2 shows a base 15 with an absolute position code 16 (shown schematically on a large scale) which is such that any part of the absolute position code 16 of a predetermined size codes a position on an imaginary surface. Examples of different types of useable absolute position codes are given in Applicant's International Patent Applications WO 01/26032, WO 01/26033 and WO 00/73983, which are hereby incorporated by reference. These absolute position codes can define a large number of positions, which consequently make up a large imaginary surface.

According to a preferred embodiment, different parts of the imaginary surface, that is different position areas, are dedicated to different functions or operations. The position code can thus be used for electronic recording of handwritten information and also for controlling the processing of the information thus recorded. The functionality is thus coded into the base 15 via the position code 16. This technique is described in greater detail in Applicant's International Patent Applications WO 01/48591, WO 01/48678 and WO 01/48685, which are hereby incorporated by reference.

The look-up unit 14 shown in FIG. 1 is designed to receive one or more positions from the pen 1 and to return to the pen 1 a network address, typically a URL, regarding the service providing unit 7–9 which is dedicated to managing information containing these positions, that is information written down on the relevant part of the imaginary surface.

The use of the system in FIG. 1 can be exemplified with reference to FIG. 2. When a user makes a note on the base 15 with the pen 1, the pen's sensor 2 (FIG. 1) continually records images of the base 15 with the associated position code 16. The images are converted in the main processor unit 3 into a sequence of positions, which form an electronic version of the written-down information and are stored in the pen's memory unit 4. When the user then marks a "send" box 17 on the base 15, a "send" command is generated in the pen 1, which is thereby caused to send an address query to the look-up unit 14 via the transceiver 5. After the receipt of a network address from the look-up unit 14, the pen sends the recorded information that is associated with the "send" command to the indicated network address.

The memory unit 4 of the pen 1 has a limited storage capacity, among other things as a result of limitations in the available installation space in the pen, in the power consumption and in the production cost. With the components described above, it is possible to store electronic handwriting corresponding to approximately 50 full A4 pages. With the aim of eliminating this limitation, the memory unit 4 of the pen 1 is connected to the memory unit 12 of the data storage device 10, via the transceivers 5, 11, in such a way that the pair of memory units operate, from the point of view of the user, as a single coherent memory. This is illustrated in FIG. 3, which shows the memory of the pen 1 as consisting of two parts, an internal memory part M1 and an external memory part M2, which are connected via a communication link L.

The external memory part M2, corresponding to the memory unit 12 in the data storage device 10, can in principle be realized by any memory circuits, typically one or more hard disks, and can therefore be designed with any storage capacity.

Figure 3:
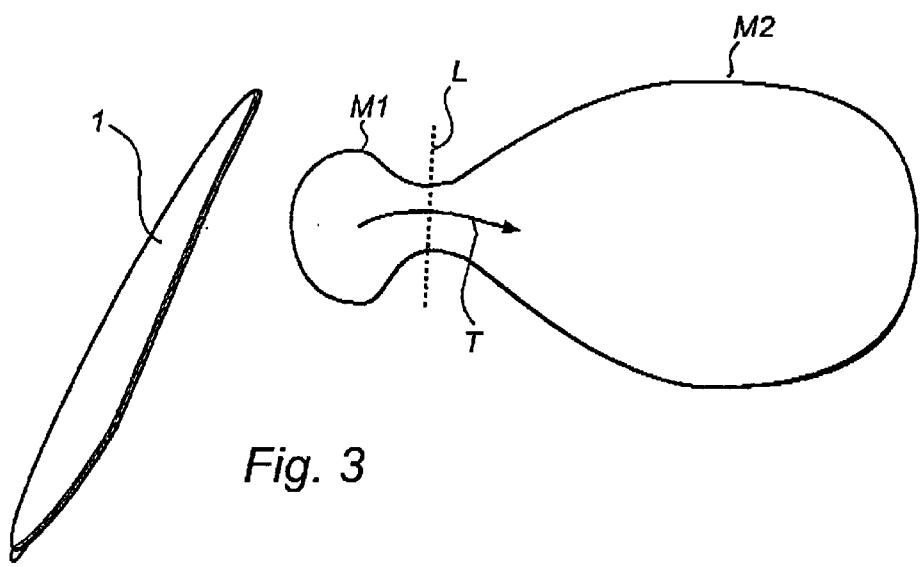
FIG. 3 illustrates the operation of the memory in the user unit.

In the currently preferred embodiment, a one-way transmission of recorded information is implemented from the memory part M1 to the memory part M2, as indicated by the arrow T in FIG. 3. Consequently, the traffic across the interface L is minimized, while at the same time the transmission of information can be carried out in accordance with predetermined rules. The information can thus be transferred automatically, without the need for intervention by the user, in accordance with the predetermined rules. It should, however, be pointed out that, if required, control signals can be communicated in both directions between the transceivers 5, 11. Such a control signal can be a confirmation signal from the data storage device 10 that a subset of information has been received and stored successfully in the external memory part M2. When receiving the confirmation signal in the pen 1, deletion of the corresponding information in the internal memory part M1 is initiated. This takes place hidden from the user, who experiences the pen as a single large, coherent, internal memory unit. In other words, a kind of hidden data transmission, governed by needs and rules, is carried out from the pen 1 to the external data storage device 10, the transferred data being deleted from the pen 1, immediately or upon receipt of a confirmation signal.

What rules are applied depends among other things on the preferences of the user and on the construction of the system.

In an embodiment where the transmission from the pen 1 to the data storage device 10 is carried out via a mobile telephone network, either directly or via the above-mentioned network connection unit, it can be advantageous to cause the transmission to be carried out at a time when the transmission cost is the least. This rule can be supplemented by the generation of a "send" command meaning that all related information is to be transferred to the memory part M2 as soon as possible, regardless of cost.

In an embodiment where the pen 1 is able to communicate via both a mobile telephone network and a computer network, the pen 1 can be configured to transfer the information from the memory part M1 to the memory part M2 only when in contact with the computer network, so that the information is transferred at minimal cost.

A rule can mean that the information is transferred to the memory part M2 when there is access to a given minimum bandwidth in the communication link L.

An additional rule can be that the information is transferred to the memory part M2 as soon as the communication link L is established.

A preferred rule is that the information is transferred when the internal memory unit 4 has attained a given level of fullness. Such a rule ensures that the pen 1 operates adequately in all situations. With the use of dynamic compression of the stored information, the level of fullness can correspond to a given degree of compression, whereby the rule ensures the quality of the stored information.

In a preferred embodiment, the transmission from the memory part M1 to the memory part M2, that can take up a part of the main processor unit's 3 data processing capacity, is configured to be carried out with minimal user disturbance. According to an embodiment, the transmission is carried out latently when the user unit is being switched off and/or when the user unit is being placed in a given position, for instance is put down or placed in a stand, and/or when the user unit has not recorded any new information for a given period of time.

Figure 4A:
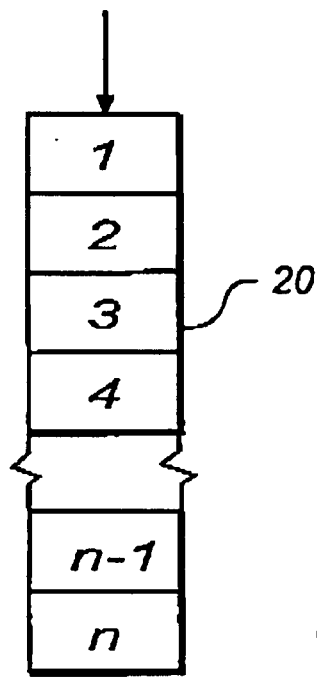
FIGS. 4a–4b show different embodiments of internal memory units in the user unit.
Figure 4B:
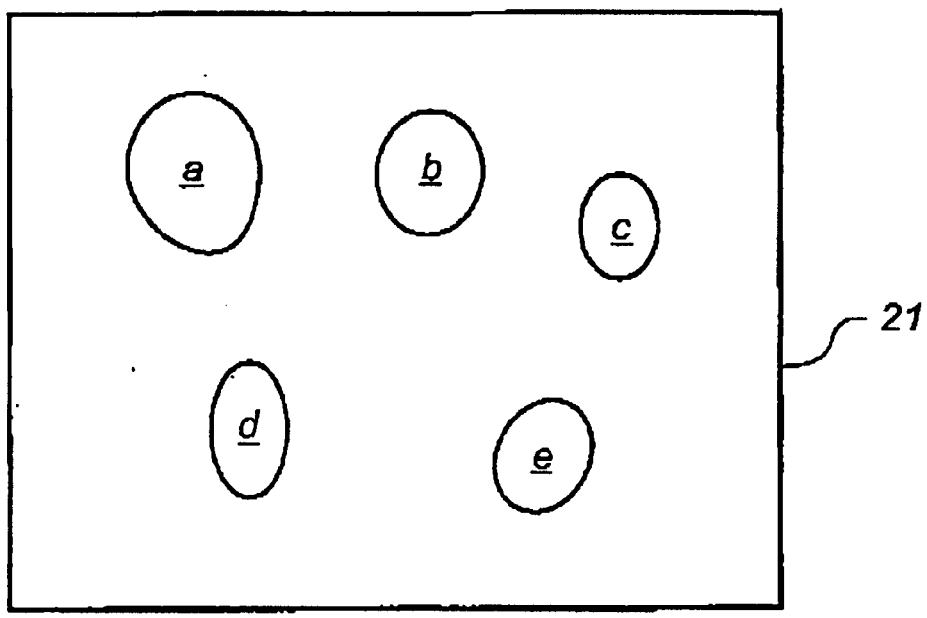

The above rules relate to the time of transmission of recorded information from the memory part M1 to the memory part M2. Other rules can relate to what is to be transferred. According to one such rule, the pen's 1 internal memory unit 4 operates according to the principle that the oldest information is transferred first. This principle is exemplified in FIG. 4a, where the most recently recorded information is stored in the upper part of a shift memory unit 20, which upper part has the number 1. When information is recorded and stored at a later time, the previously stored information is moved down a step in the shift memory unit 20, after which the new information is stored in the upper part. Information that was recorded by the pen 1 is thus shifted down gradually until it is transferred from the pen 1 after having been shifted out of the memory unit's 20 lowest part (designated n in FIG. 4a). It must be pointed out that the above principle can also be realized without shifting of the information. FIG. 4b shows a memory unit 21 where information recorded at different times is distributed in memory blocks a–e. The transmission of information from the memory unit's 21 memory blocks a–e can be implemented on the basis of time-stamping, for example relating to the time of recording of the information or the time of storage of the information in the respective memory block.

According to an advanced embodiment, the user is allowed to prioritize different types of information, for example in such a way that certain information is transferred as soon as possible, while other information is transferred at minimal cost.

In the preferred embodiment, the user is offered access to the extended memory part M2 as an option of the pen 1. This means that the pen 1 should be capable of operating in the system in FIG. 1 both with and without this option, and that the option should result in minimal modification of the other parts of the system. A pen without the option is configured in such a way that after detection of a "send" command via the transceiver 5, and any network connection unit, it sends an address query to the look-up unit 14, and that after the receipt of a network address from the look-up unit 14, it sends all the information in the memory unit 4 associated with the "send" command to the service providing unit 7–9 that is identified by the network address. A pen with the option is, on the other hand, configured to transfer information from the internal memory unit 3 to the memory unit 12 automatically and in accordance with some predetermined rule, to send an address query to the look-up unit 14 after the detection of a "send" command, and then to send a received network address together with the "send" command and any associated information in the memory unit 4 (that is information that has not already been transferred to the memory unit 12 in accordance with the above-mentioned rules) to the data storage device 10, the processor unit (not shown) of which communicates via the communication unit 13 all the information associated with the "send" command (that is both information received from the pen 1 with the "send" command and information stored in the memory unit 12) to the service providing unit 7–9 that is identified by the network address. The communication unit 13 is here suitably designed in such a way that the service providing units 7–9 cannot or do not need to distinguish between information that is sent from a pen with or without the option.

According to an embodiment, the option can be charged to the user on the basis of the length of the period of time during which the recorded information is to be stored in the memory unit 12 of the data storage device 10. According to an alternative embodiment, the user is charged on the basis of the size of the memory capacity allocated to the pen in the memory unit 12.

In addition to offering the user increased storage space as an option of an existing pen, it is possible within the scope of the above system to sell different versions of the pen, for example a high-end version with "unlimited" storage space according to the invention and a low-end version with limited memory according to conventional technology.

To return to FIG. 1, the system also comprises an interface unit I which is connected to the data storage device 10 and which allows the user to at least review all the information that has been recorded with a particular pen 1 and transferred to the memory unit 12. It is also plausible for the user to be allowed to edit or download recorded information from the memory unit 12 via the interface unit I, or to send information from the memory unit 12 to a recipient, via the communication unit 13. In addition, the user can be given the ability, via the interface unit I, to modify the above-mentioned rules for the transmission of information between the memory units 4, 12, to his own requirements. The interface unit I can be realized in the form of a web server with a portal or the like to the Internet. The user can thus connect to the interface unit I via a browser on some suitable device, such as a PC, a PDA or a mobile telephone.

Figure 5:
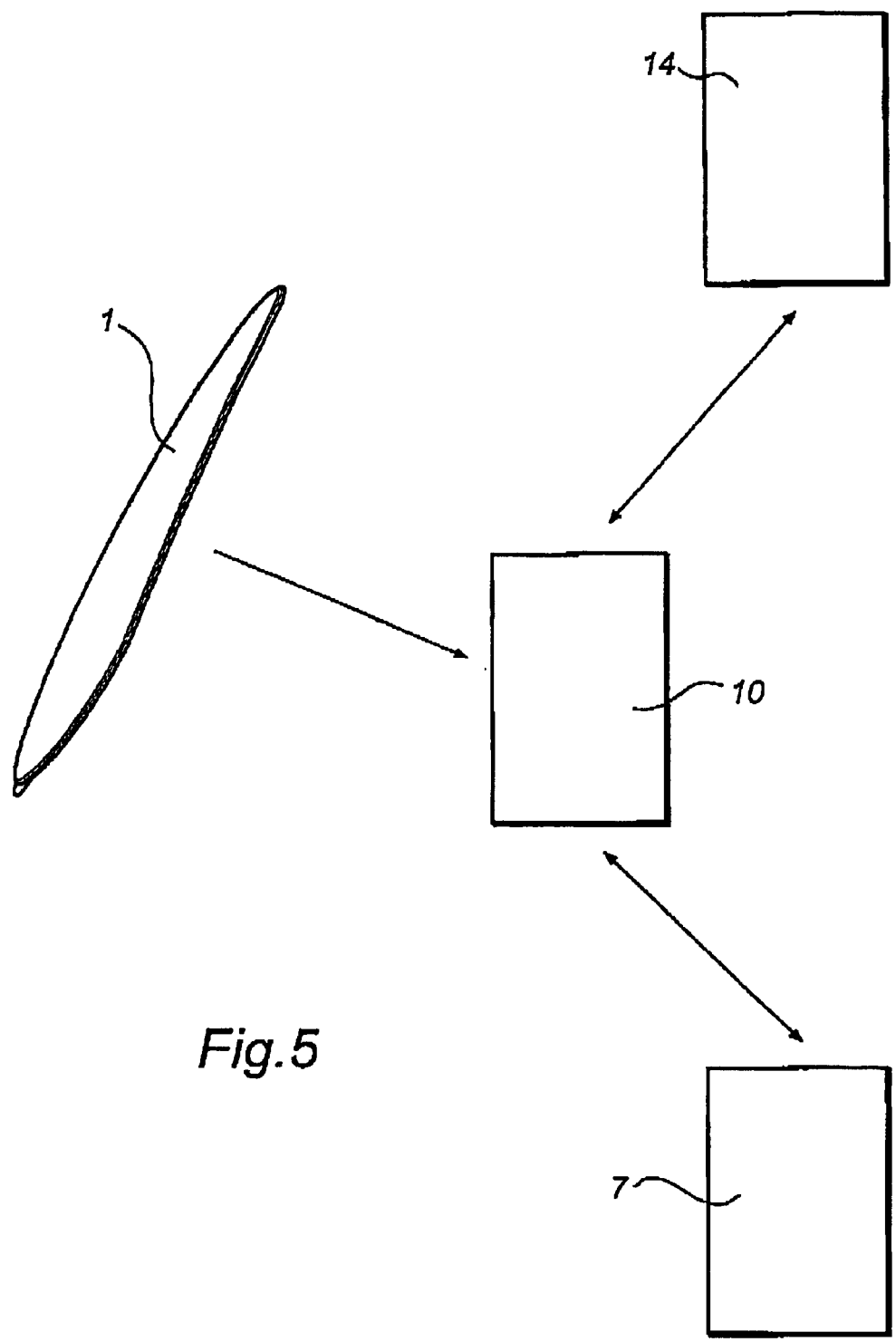
FIG. 5 shows a system according to an alternative embodiment.

FIG. 5 shows an alternative to the system in FIG. 1, with the difference that the address query is made from the data storage device 10 instead of from the pen 1. In the system in FIG. 5, the pen 1 is thus arranged, after the detection of a "send" command, to transfer this and the associated information in the internal memory unit to the data storage device 10, which makes an address query in the look-up unit 14, collates the recorded information that is associated with the "send" command and sends this to the indicated service providing unit 7. Otherwise the system can be realized in the same way as the system in FIG. 1.

A person skilled in the art will recognize that the embodiments described above can be varied within the scope of the invention as this is expressed in the appended claims. For example, the pen could be connected via a wire, across which the information is transferred to the data storage device, for example via a network connection unit, such as a modem, a mobile telephone, a PDA or a PC.

It is also possible for the recorded information, that can be divided between the pen and the data storage device upon the detection of the "send" command, to be sent to an indicated service providing unit from both the pen and the data storage device. However, this requires the service providing unit to be capable of collating the received fragments of information.

It must also be pointed out that the system can be designed in such a way that all the information management of the recorded information is carried out directly in the external data storage device. Alternatively, the data storage device can comprise a database with all the network addresses of the service providing units in the system, for which reason no address query needs to be made.

Finally, it should be pointed out that the invention can also be used with other types of hand-held user units for recording information, for example reading pens for electronic text input.

What we claim and desire to secure by letters patent is:

1. A hand-held pen device for recording a track of handwritten information created by the pen device, comprising:
    a device for recording said information in a digital format and a memory for storing the same, wherein the memory includes:
    a first memory unit located in the pen device; and
    a second memory unit located in an external data storage device, which memory units are connected in such a way that a transmission of said recorded information is caused to occur automatically from the first memory unit to the second memory unit, and through transmission of the recorded information from the first memory unit to the second memory unit, the recorded information can exceed the storage capacity of the first memory unit and thereby, from the point of view of the user the first memory unit and second memory unit form a coherent memory unit,
    wherein the hand-held pen device is arranged, after a "send" command, to send all information associated with the "send" command and stored in the first and second memory units to an external information management unit.

2. A hand-held pen device according to claim 1, further comprising a device for transmission of information between the first and the second memory units, the first memory unit being arranged to receive and store the recorded information from the recording device and the information transmission device being arranged to transfer according to predetermined rules at least a subset of the recorded information from the first to the second memory unit for storage therein.

3. A hand-held pen device according to claim 2, in which the information transmission device is arranged to carry out exclusively one-way transmission of information from the first to the second memory unit.

4. A hand-held pen device according to claim 2, in which said rules comprise transferring said information when the first memory unit has attained a given level of fullness.

5. A hand-held pen device according to claim 2, in which said rules comprise transferring said information when this has been stored in the first memory unit for a certain period of time.

6. A hand-held pen device according to claim 2, in which the information transmission device is arranged to carry out wireless transmission of information from the pen device.

7. A hand-held pen device according to claim 2, in which the information transmission device is arranged to transfer all the recorded information to the second memory unit.

8. A hand-held pen device according to claim 2, in which the information transmission device is arranged, after the "send" command, to send a subset of the information associated with the "send" command from the first memory unit to the second memory unit.

9. A hand-held pen device according to claim 8, which is arranged, after the "send" command, to obtain an address for the information management unit, by a request to an external look-up unit and on the basis of said positions.

10. A hand-held pen device according to claim 9, which is arranged to obtain said address via a communication unit in the external data storage device.

11. A hand-held pen device according to claim 1, in which the recorded information comprises a plurality of absolute positions that form an electronic version of the handwritten information.

12. A hand-held pen device according to claim 1, in which the second memory unit has a data storage capacity that is considerably larger than the data storage capacity of the first memory unit.

13. A hand-held pen device according to claim 1, in which said device for recording handwritten information comprises an image sensor for optical recording of a position code on a base.

14. A hand-held pen device, comprising:
    a device for recording a track of handwritten information created by the pen device; and
    an information transmission device for transferring information from the pen device, the pen device in a first memory management mode being arranged to store the recorded information in an internal memory unit and, after detection of a "send" command, to communicate at least a subset of the recorded information via the information transmission device,
    the pen device being switchable to a second memory management mode, in which the information transmission device is caused to transfer the recorded information automatically from the internal memory unit to an external memory unit in an external data storage device in such a way that by said transfer the recorded information can exceed the storage capacity of the internal memory unit and thereby, from the point of view of the user, the memory units form a coherent memory unit.

15. A hand-held pen device according to claim 14, which, in the second memory management mode, is arranged to carry out exclusively one-way transmission of information from the internal to the external memory unit, and to communicate all information associated with the "send" command via a communication unit in the external data storage device.

16. A hand-held pen device according to claim 14, which, in the second memory management mode and after the detection of the "send" command, is arranged to cause the information transmission device to transfer the "send" command and all information associated with the "send" command in the internal memory unit to the external memory unit.

17. A system for information management, comprising:
    an information management unit; and
    a hand-held pen device which is designed for recording a track of handwritten information created by the pen device, the pen device being arranged to store the recorded information in a memory and to communicate a required part thereof to the information management unit via a communication network, wherein the memory includes:
    a first memory unit located in the pen device; and
    a second memory unit located in an external data storage device, which memory units are connected in such a way that a transmission of said recorded information is caused to occur automatically from the first memory unit to the second memory unit, and through a transmission of the recorded information from the first memory unit to the second memory unit the recorded information can exceed the storage capacity of the first memory unit and thereby, from the point of view of a user, the first memory unit and the second memory unit form a coherent memory unit, wherein the external data storage device comprises a network server with an interface that allows a user of the pen device to access the recorded information.

18. A system according to claim 17, in which the first memory unit is arranged to receive and store the recorded information and in which the pen device is arranged to transfer in accordance with predetermined rules at least a subset of the recorded information from the first to the second memory unit for storage therein.

19. A system according to claim 18, in which the pen device is arranged to carry out exclusively one-way transmission of information from the first to the second memory unit, and to communicate the required part of the recorded information to the information management unit via a communication unit in the external data storage device.

20. A system according to claim 17, which is arranged, after a "send" command, to send all the information associated with the "send" command and stored in the first and second memory units to the information management unit.

21. A system according to claim 20, in which the pen device is arranged, after the "send" command, to send a subset of the information associated with the "send" command, from the first memory unit to the external data storage device.

22. A system according to claim 20, further comprising a base with a position code, in which the pen device comprises an image sensor for optical recording of the position code and a processor unit for converting the recorded position code into absolute positions that form an electronic version of the handwritten information, and in which the pen device is arranged to obtain an address for the information management unit, after the "send" command, by a request to an external look-up unit and on the basis of said positions.

23. A system according to claim 22, in which the pen device is arranged to obtain said address via a communication unit in the external data storage device.

24. A method for providing memory capacity for a user of a hand-held pen device which is designed for recording and communicating a track of handwritten information created by the pen device, comprising the steps of:

reserving memory capacity for the pen device in an external data storage device;

receiving, automatically, recorded information from a memory located in the pen device and storing the same in the external data storage device, and sending the recorded information to an information management unit in response to a "send" command.

25. A method according to claim 24, comprising the step of storing the received information for a predetermined period of time from the time of recording, the user being charged on the basis of the length of the period of time.

26. A method according to claim 24, in which the "send" command is received from the pen device.

27. A method according to claim 26, comprising the step of charging the user on the basis of the memory capacity reserved for the user in the external data storage device.

28. A method for memory management in a pen device, which is arranged to record a track of handwritten information created by the pen device, comprising the steps of:

storing the recorded information in a first memory unit in the pen device;

transferring at least a subset of the recorded information from the first memory unit to a second memory unit in an external data storage device in such a way that a transmission of said recorded information is caused to occur automatically from the first memory unit to the second memory unit, and the recorded information can exceed the storage capacity of the first memory and thereby, from the point of view of a user, the first and second memory units form a coherent memory unit, arranging the hand-held pen device, after a "send" command, to send all information associated with the "send " command and stored in the first and second memory units to an external information management unit.

* * * * *